(12) United States Patent
Yagi

(10) Patent No.: US 7,183,556 B2
(45) Date of Patent: Feb. 27, 2007

(54) RADIATION DETECTING CASSETTE

(75) Inventor: Keiichi Yagi, Kanagawa-ken (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 238 days.

(21) Appl. No.: 10/861,925

(22) Filed: Jun. 7, 2004

(65) Prior Publication Data

US 2005/0017188 A1 Jan. 27, 2005

(30) Foreign Application Priority Data

Jun. 9, 2003 (JP) .............................. 2003/163300

(51) Int. Cl.
*G01T 1/24* (2006.01)
(52) U.S. Cl. ............................. 250/370.09
(58) Field of Classification Search ............ 250/370.09
See application file for complete search history.

(56) References Cited

U.S. PATENT DOCUMENTS

| 6,268,614 | B1 | 7/2001 | Imai | |
|---|---|---|---|---|
| 6,825,472 | B2* | 11/2004 | Endo | ............. 250/370.09 |
| 2002/0005490 | A1* | 1/2002 | Watanabe | ............. 250/370.09 |
| 2002/0014594 | A1 | 2/2002 | Endo | |
| 2005/0056789 | A1* | 3/2005 | Spahn et al. | ........... 250/370.09 |

FOREIGN PATENT DOCUMENTS

| EP | 0 603 709 A2 | 6/1994 |
|---|---|---|
| JP | 2000-284056 A | 10/2000 |
| JP | 2002-14170 A | 1/2002 |

\* cited by examiner

*Primary Examiner*—David Porta
*Assistant Examiner*—Christoher Webb
(74) *Attorney, Agent, or Firm*—Sughrue Mion, PLLC

(57) ABSTRACT

A solid-state radiation detector is provided which has an improved positional precision within a casing thereof while ensuring the shock resistance properties. A radiation cassette comprises: a solid-state radiation detector which is an image pickup device, a casing constituted by upper and lower shell halves and accommodates therein the solid-state radiation detector and the like. Each of the upper and lower shell halves comprises: an outer frame; an inner frame, and a coupling member for coupling the outer and inner frames. A space between the outer frame and the inner frame is filled with a shock absorbing material, thereby imparting shock absorbency to the casing itself. The solid-state radiation detector is rigidly secured to the inner frame of the lower shell half.

4 Claims, 3 Drawing Sheets

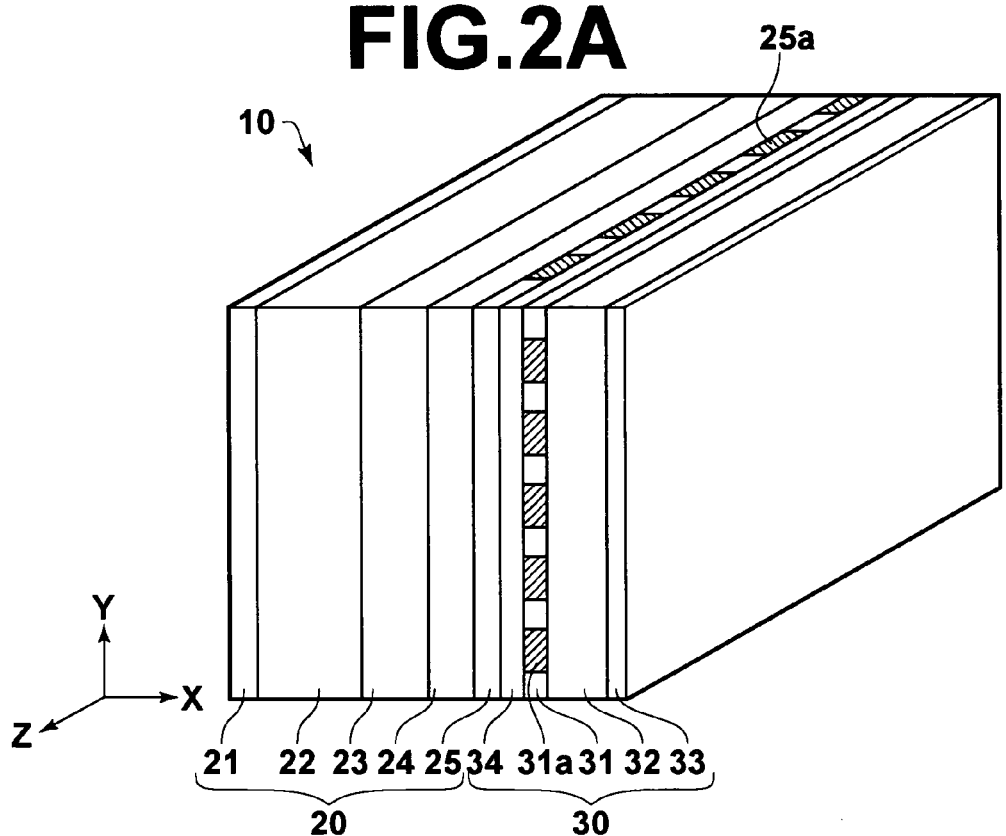
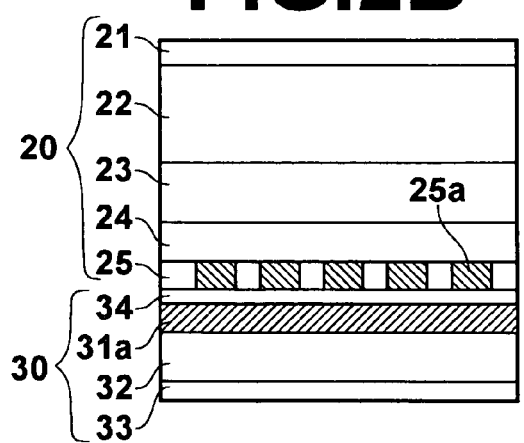
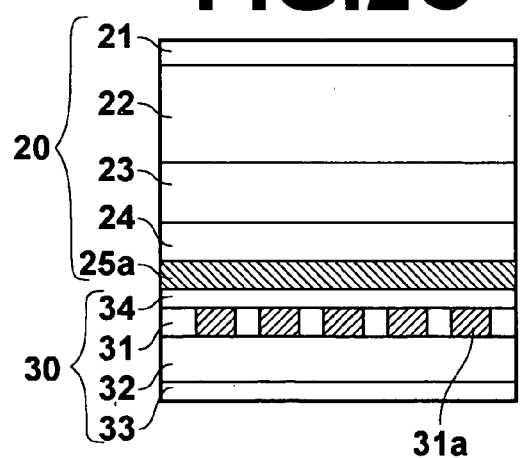

RADIATION DETECTING CASSETTE

BACKGROUND OF THE INVENTION

1. Field of the Invention

This invention relates to a radiation detecting cassette having a solid state radiation detector accommodated within a casing.

2. Description of the Related Art

In the field of radiography for medical diagnosis and the like, various solid-state radiation detectors (whose main part comprises semiconductors; hereinafter also simply referred to as "detectors") which detect radiation penetrating a subject and produce an image signal carrying radiographic image information of the subject (see, for example, U.S. Pat. No. 6,268,614 and Japanese Unexamined Patent Publication No. 2000-284056 have recently been proposed and brought into practical use. Concomitantly with this, various radiation detecting cassettes having a case accommodating therein such a solid-state radiation detector and the like (see, for example, U.S. Patent Laid-Open No. 20020014594 and Japanese Unexamined Patent Publication No. 2002-014170 have been proposed.

Such a radiation detecting cassette is relatively thin and made in portable size. This allows radio photographing with a very high degree of freedom. For example, even for a patient who is not ambulatory, a radio photograph can be taken by placing the radiation detecting cassette under a body part of the patient to be radio photographed while keeping the patient on a bed, and then moving a radiation source of a radiation image information recording apparatus to a position on a side of the patient opposite the radiation detecting cassette.

As one specific example, the radiation detecting cassette may have a construction where the solid-state radiation detector and an electric circuit board for processing a signal detected by the detector are secured inside a casing of the cassette, and where the solid-state radiation detector and the electric circuit board are connected with each other via a flexible circuit board.

In order to prevent damage to the solid-state radiation detector accommodated within such a radiation detecting cassette when the cassette is subjected to outside impact, aforementioned Japanese Unexamined Patent Publication No. 2002-014170 proposes a radiation detecting cassette, in which a shock absorbing material is disposed on an upper side (i.e., a side to be exposed to the radiation) of the solid-state radiation detector, while a lower side of the solid-state radiation detector is secured to the frame. With this configuration, the solid-state radiation detector cannot move towards the bottom of the radiation detecting cassette. Therefore, if the solid-state radiation detector is subjected to a shock in the direction towards the bottom thereof, shock cannot be absorbed.

On the other hand, when elastomeric bodies such as rubber or gel are used to sandwich the solid-state radiation detector therebetween for supporting the upper and lower surfaces of the detector as proposed in U.S. Patent Laid-Open No. 20020014594 mentioned above, it is difficult to ensure the positional precision of the solid-state radiation detector within the casing because the elastic bodies tend to change their shape.

SUMMARY OF THE INVENTION

The present invention was developed in view of the foregoing problems, and has an object to provide a radiation detecting cassette which improves positional precision of the solid-state radiation detector within the casing, while ensuring the shock resistance properties of the radiation detecting cassette.

In accordance with the present invention, there is provided a radiation detecting cassette comprising: a plate-type solid-state radiation detector for recording image information carried by radiation upon exposure to the radiation and outputting an image signal representing the recorded image information; and a casing for accommodating therein the solid-state radiation detector, wherein the casing is constituted by an outer frame and an inner frame, wherein a limiting member for limiting movement of the inner frame relative to the outer frame is provided between the inner side surface of the outer frame and the outer side surface of the inner frame, and wherein a space between the outer frame and the inner frame is filled with a shock absorbing material.

As used herein, the term "solid-state radiation detector" means a detector, which detects radiation, carrying image information of an object, and outputs an image signal representing a radiation image of the object. The solid-state radiation detector converts the incident radiation into electric charges directly or after converting the radiation into light, accumulates the electric charges at charge accumulating sections, and thereafter outputs the electric charges to the exterior. In this manner, the image signal representing the radiation image of the object can be obtained.

There are various types of solid-state radiation detectors. For example, from the aspect of a charge forming process for converting the radiation into electric charges, the solid-state radiation detectors may be classified into photo conversion type solid-state radiation detectors and direct conversion type solid-state radiation detectors. With the photo conversion type solid-state radiation detectors, the fluorescence, which is produced by a fluorescent material when it is exposed to radiation carrying image information, is detected by a photoelectric conversion device, and the thus obtained electric charges are accumulated at charge accumulating sections of the photoelectric conversion devices. The accumulated electric charges are then converted into an image signal (i.e., an electric signal), and the image signal is fed out. With the direct conversion type solid-state radiation detectors, electric charges, which are generated in a radiation conductive material when it is exposed to radiation carrying image information, are collected by charge collecting electrodes and accumulated at charge accumulating sections. The accumulated charges are then converted into an electric signal, and the electric signal is fed out. On the other hand, from the aspect of a charge reading process for reading the accumulated electric charges to the exterior, the solid-state radiation detectors may be classified into, for example, thin-film transistor (TFT) reading type solid-state radiation detectors, wherein TFT's, each of which is connected to one of the charge accumulating sections, are operated successively in order to read the accumulated electric charges; photo reading type solid-state radiation detectors, wherein the accumulated electric charges are read by irradiating reading light (an electromagnetic wave for reading) to the solid-state radiation detectors; and improved direct conversion type solid-state radiation detectors, which utilize a combination of the direct conversion type techniques and the photo reading type techniques proposed in U.S. Pat. No. 6,268,614 and Japanese Unexamined Patent Publication No. 2000-284056 mentioned above. The radiation detecting cassette in accordance with the present invention may comprise any type of solid-state radiation detector housed within a case.

The shock absorbing material may be any of materials that include, but are not limited to, a viscoelastic material such as a soft rubber or a gel, and a foamed material such as styrene-foam or urethane foam.

In the radiation detecting cassette of the present invention, the outer frame is preferably flexible.

In the radiation detecting cassette according to the present invention, a casing for accommodating therein a solid-state radiation detector may comprise: an outer frame; an inner frame; and a limiting member which is disposed between the inner side surface of the outer frame and the outer side surface of the inner frame, and serves to limit the movement of the inner frame relative to the outer frame, and a space between the outer frame and the inner frame is filled with a shock absorbing material in order to impart shock absorbency to the casing itself. This enables to provide a sufficient shock resistance without holding the solid-state radiation detector between elastic bodies, thereby improving positional precision of the solid-state radiation detector within the casing thereof while ensuring the shock resistance properties.

Further, according to the present invention, the outer frame may be made to be flexible such that the outer frame can be readily deformed, whereby the shock applied thereto is more effectively absorbed.

BRIEF DESCRIPTION OF THE DRAWINGS

FIG. 2A is a perspective view of a solid-state radiation detector used for the radiation detecting cassette in FIG. 1, FIG. 2B is a cross sectional view taken through plane X–Z of FIG. 2A, and FIG. 2C is a cross sectional view taken through plane X–Y of FIG. 2A.

DESCRIPTION OF THE PREFERRED EMBODIMENTS

Figure 1:
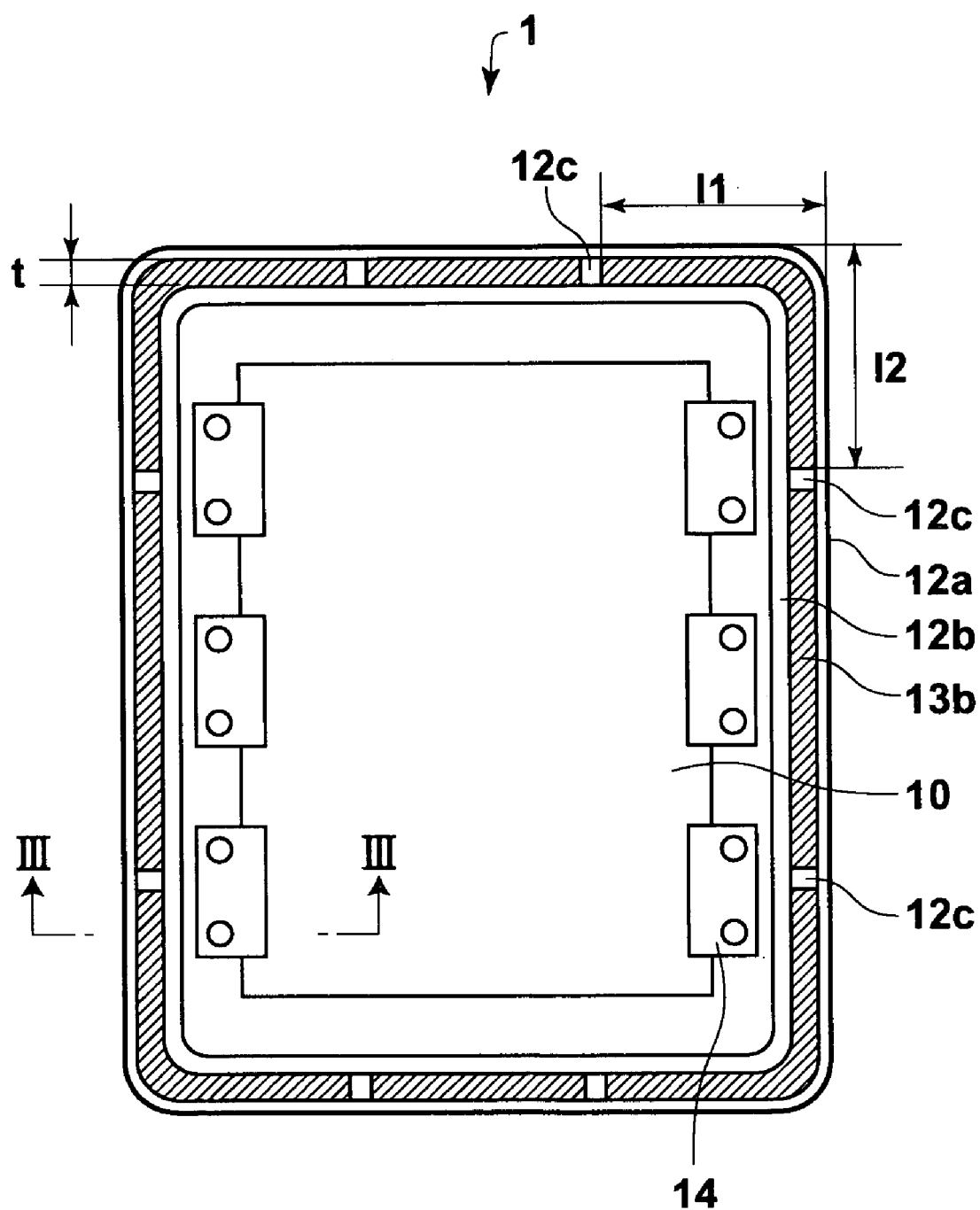
FIG. 1 is a plan view of an embodiment of a radiation detecting cassette according to the present invention, shown with an upper shell half removed.
Figure 3:
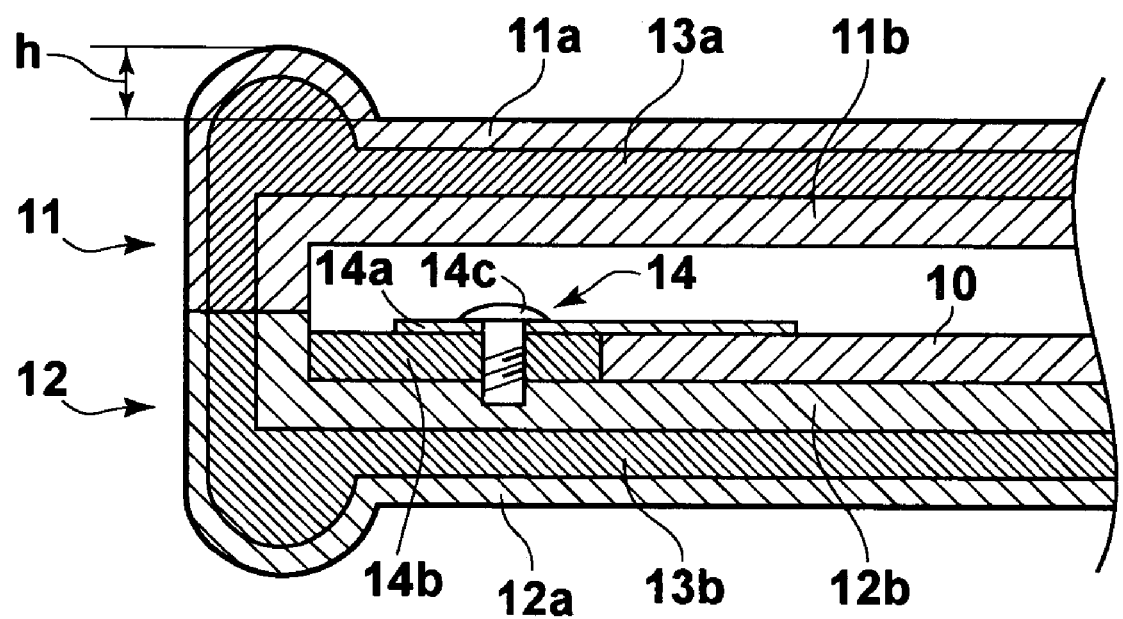
FIG. 3 is a cross sectional view of the radiation detecting cassette including the upper shell half, taken along line III—III of FIG. 1.

An embodiment of the radiation detecting cassette in accordance with the present invention will be described hereinbelow. FIG. 1 is a plan view of an embodiment of a radiation detecting cassette according to the present invention, with an upper shell half removed, FIG. 2A is a perspective view of a solid-state radiation detector used for the radiation detecting cassette in FIG. 1, FIG. 2B is a cross sectional view taken through plane X–Z of FIG. 2A, FIG. 2C is a cross sectional view taken through plane X–Y of FIG. 2A, and FIG. 3 is a cross sectional view of the radiation detecting cassette including the upper shell half, taken along line III—III of FIG. 1.

A radiation detecting cassette 1 has a casing constituted by upper and lower shell halves 11 and 12. The radiation detecting cassette 1 includes a solid-state radiation detector 10, which is an image pickup device; an electric circuit board (not shown) for providing an image signal by detecting a current from the solid-state radiation detector 10; a flexible circuit board (not shown) for connecting the solid-state radiation detector 10 and the electric circuit board; and a power supply unit (not shown), all of which are housed in the casing.

The upper shell half 11 comprises: a generally parallelepiped-shaped outer frame 11a having one open side; a generally parallelepiped-shaped inner frame 11b having one open side; and a coupling member (not shown) of the upper shell half 11 disposed between the inner side surface of the outer frame 11a and the outer side surface of the inner frame 11b. The coupling member of the upper shell half 11 is secured at both ends to the inner side surface of the outer frame 11a and the outer side surface of the inner frame 11b. A space extending between the outer frame 11a and the inner frame 11b is filled with a shock absorbing material 13a.

Similarly, the lower shell half 12 comprises: a generally parallelepiped-shaped outer frame 12a having one open side; a generally parallelepiped-shaped inner frame 12b having one open side; and a coupling member 12c disposed between the inner side surface of the outer frame 12a and the outer side surface of the inner frame 12b. The coupling member 12c is secured at both ends to the inner side surface of the outer frame 12a and the outer side surface of the inner frame 12b. A space extending between the outer frame 12a and the inner frame 12b is filled with a shock absorbing material 13b.

Both of the inner frames 11b and 12b of the upper and lower shell halves 11 and 12 may be formed of an injection-molded resin material such as ABS or polycarbonate to have a thickness of 1 to 3 mm, or may be formed of a metallic material such as aluminum or magnesium alloy. If an electrostatic shielding effect is desired, it is necessary to provide a metal film, for example by plating, on the inner surface of the inner frame formed of metal or resin.

The wider the space between the outer frames 11a, 12a and the inner frames 11b, 12b, the higher the shock absorbing effect. However, as the space is taken wider, the entire size of the radiation detecting cassette 1 accordingly becomes larger. Thus, the aforementioned space is preferably about 5 mm.

Since the coupling members (not shown) and 12c also serve as a limiting member to limit the respective movements of the inner frames 11b and 12b relative to the outer frames 11a and 12a, it is necessary that the coupling members (not shown) and 12c have a certain degree of rigidity. However, having an excessive degree of rigidity larger than necessary is undesirable in terms of shock absorbency. Thus, the coupling members (not shown) and 12c are preferably formed of a material which has a higher rigidity than that of the shock absorbing material 13a, 13b and can absorb a certain degree of shock. Examples of suitable materials include, but are not limited to: hard rubber, nonrigid plastic, fluorocarbon resin, and polyacetal.

Since portions, on which the coupling members (not shown) and 12c are provided, are inferior in shock absorbency to the remaining area, it is desirable that the coupling members (not shown) and 12c are not provided near any of the corners of the casing which are apt to be subjected to an impact. Specifically, it is desirable that the coupling members (not shown), 12c are not provided in the range extending within 10% of the length of each of the sides from each corner included thereby, and preferably not within 20% of the length of each side from each corner included thereby.

In the specific embodiment described above, the coupling members (not shown), 12c are fixedly attached at both ends. However, the radiation detecting cassette of the present invention is not limited to this construction. Both ends or one end of the coupling member (not shown), 12c may not be fixedly attached so long as the coupling member (not shown), 12c serves as a limiting member for limiting the movement of the inner frame relative to the outer frame.

The shock absorbing material 13a, 13b may be any of materials that include, but are not limited to, a viscoelastic material such as a soft rubber or a gel, and a foamed material such as styrene-foam or urethane foam.

The outer frames 11a and 12a of the upper and lower shell halves 11 and 12 are formed of flexible resin such that the outer frames are readily deformable. Thus, when the radiation detection cassette encounters a shock, the shock is effectively absorbed by deforming the outer frames 11a and/or 12a. When an internal pressure produced by filling the shock absorbing material 13a and 13b is used in order to impart a shape to the outer frames 11a and 12a, it is necessary to make the outer frames from, for example, a PET or polyester film having a thickness of approximately 10 to 50 μm. On the other hand, in order to make the outer frames 11a and 12a elastically resilient such that they can take up their memory position after being subjected to deformation, it is necessary to use resin such as PET or polypropylene having a thickness of approximately 0.2 to 0.3 mm.

Further, the peripheral edge of the main surface of each of the outer frames 11a and 12a rises above the surface as shown in FIG. 3, thereby imparting shock absorbency to the casing. This enables to effectively absorb a shock when the main surface undergoes impact.

The solid-state radiation detector 10 has a layered structure formed by placing in mutually superposed relationship a solid-state radiation detecting section 20 and a planar light source section 30 on a glass substrate (not shown).

The solid-state radiation detecting section 20 serves to record radiation image information as a latent image, and to generate an electric current corresponding to the latent image as the electrostatic latent image is scanned by a reading electromagnetic wave (hereinafter referred to as reading light). The solid-state radiation detecting section 20 is constituted by: a first electrically conductive layer 21 which is permeable to recording radiation such as X-ray passing through an object (hereinafter referred to as recording light); a recording light photoconductive layer 22 which generates a charge upon exposure to the recording light and exhibits electric conductivity; a charge transfer layer 23 which behaves like a substantially insulating material to a charge of the latent image polarity (a negative charge) accumulated in the first conductive layer 21 and behaves substantially as a conductive material to a charge of the transfer polarity (a positive charge, in this example) opposite to that of the latent image polarity; a reading light photoconductive layer 24 which generates an electric current upon exposure to the reading light and exhibits conductivity; and a second electrically conductive layer 25 permeable to the reading light. They are superimposed in this order. A charge accumulating section is formed at the interface between the recording light photoconductive layer 22 and the charge transfer layer 23.

The first electrically conductive layer 21 and second electrically conductive layer 25 serve as electrodes, respectively. The electrode constituted by the first conductive layer 21 is a two-dimensional flat plate electrode, while the electrode constituted by the second electrically conductive layer 25 is a stripe electrode constructed of a large number of electrode elements (line electrode elements) 25a disposed at intervals of a pixel pitch (for example, an electrostatically recording medium disclosed in Japanese Unexamined Patent Publication No. 2000-105297). The direction in which the elements 25a are arranged is the main scanning direction, and the longitudinal direction of the elements 25a is the sub-scanning direction. Each element 25a is connected to a current detecting device on the electric circuit board via the flexible circuit board.

Preferably, the reading light photoconductive layer 24 is made of a material which is high in sensitivity to an electromagnetic wave in the region from near-ultraviolet to blue (300 to 550 nm) and low in sensitivity to an electromagnetic wave in the red region (not shorter than 700 nm), e.g., a photoconductive material containing as a major component at least one of a-Se, $PbI_2$, $Bi_{12}$ (Ge, Si) $O_{20}$, perylenebisimide (R=n-propyl) and perylenebisimide (R=n-neopentyl). In the present embodiment, a-Se is used.

The planar light source section 30 is an EL (electroluminescent) light emitter and is constituted by an electrically conductive layer 31, an EL layer 32, and an electrically conductive layer 33. An insulating layer 34 is disposed between the second electrically conductive layer 25 of the solid-state radiation detecting section 20 and the electrically conductive layer 33. The electrically conductive layer 31 is a stripe electrode having a large number of electrode elements (line electrode elements) 31a disposed at intervals of a pixel pitch such that each electrode element 31a extends transversely of (in this embodiment, substantially perpendicular to) the elements 25a of the solid-state radiation detecting section 20. Thus, a large number of linear light sources, which are respectively constituted by electrode elements 31a (the hatched region in the drawing), are arrayed in a planar state. Each of the elements 31a is connected to a light source controlling device on the electric circuit board via the flexible circuit board. The respective elements 31a are made of a material that transmits the EL light from the EL layer 32. The electrically conductive layer 33 is a plate electrode made of a material by which the EL light from the EL layer 32 is completely reflected.

The light source controlling device individually or simultaneously applies a predetermined voltage between each of the elements 31a and a corresponding portion facing thereto of the electrically conductive layer 33. More particularly, the light source controlling device sequentially applies a predetermined DC voltage between the respective elements 31a and the electrically conductive layer 33. As the DC voltage is applied, EL light is emitted from a portion of the EL layer 32 positioned between the relevant element 31a and the electrically conductive layer 33. Since the element 31a is linear in shape, the EL light transmitted through the element 31a is utilized as linear reading light. Thus, the planar light source section 30 becomes equivalent to those constructed of a large number of minute linear light sources arranged in a plane. EL-emission is produced by sequentially selecting a predetermined number of the elements 31a, so that the solid-state radiation detecting section 20 is electrically scanned by the reading light.

As mentioned above, since the reading light photoconductive layer 24 is made of a material which is high in sensitivity to an electromagnetic wave in the region from near-ultraviolet to blue (300 to 550 nm) and low in sensitivity to an electromagnetic wave in the red region (not shorter than 700 nm), the planar light source section 30 (EL emitter) is required to be made of a material which emits light having an electromagnetic wave in the region from near-ultraviolet to blue (550 nm or less).

The solid-state radiation detector 10 is supported by holders 14 which are fixed to the inner frame 12b of the lower shell half 12.

The holder 14 comprises: a spacer 14b, which is substantially as high as the solid-state radiation detector 10 and includes at the center thereof an aperture that is substantially as large as solid-state radiation detector 10; a holding member 14a disposed on the upper surface side of the solid-state radiation detector 10, and a screw 14c by which the holder 14 is fixedly attached to the inner frame 12*b*. The space 14*b* and the holding member 14*a* are stacked on the inner frame in this order.

This arrangement imparts shock absorbency to the casing that accommodates therein the solid-state radiation detector 10. Consequently, it is allowed to rigidly secure the solid-state radiation detector 10 to inner frame 12*b* of the casing, as a result of which, the positional precision of the solid-state radiation detector 10 within the casing is enhanced, and deflection of the solid-state radiation detector 10 due to the self-weight thereof and distortion of the component are prevented.

In the specific embodiment described above, the casing has a double-walled construction comprising the outer frame and the inner frame. However, the radiation detecting cassette of the present invention is not limited thereto, and only the entire peripheral edge or the corners may have a double-walled construction.

What is claimed is:

1. A radiation detecting cassette comprising:
    a plate-type solid-state radiation detector for recording image information carried by radiation upon exposure to the radiation and supplying an image signal representing the recorded image information; and
    a casing for accommodating therein the solid-state radiation detector,
    wherein the casing is constituted by an outer frame and an inner frame,
    a limiting member for limiting movement of the inner frame relative to the outer frame is provided between the inner side surface of the outer frame and the outer side surface of the inner frame, and
    a space between the outer frame and the inner frame is filled with a shock absorbing material.

2. A radiation detecting cassette according to claim 1, wherein the outer frame is flexible.

3. A radiation detecting cassette according to claim 2, wherein:
    the inner surface of the outer frame is spaced about 5 mm away from the outer surface of the inner frame over the substantially entire casing.

4. A radiation detecting cassette according to claim 1, wherein:
    the inner surface of the outer frame is spaced about 5 mm away from the outer surface of the inner frame over the substantially entire casing.

* * * * *